United States Patent
Mattson

(12)
(10) Patent No.: US 6,332,737 B1
(45) Date of Patent: Dec. 25, 2001

(54) WATERWAY POLLUTION CONTROL APPARATUS

(76) Inventor: Jack Mattson, R.R. #1, Hazelton, British Columbia (CA), V0J 1Y0

( * ) Notice: Subject to any disclaimer, the term of this patent is extended or adjusted under 35 U.S.C. 154(b) by 0 days.

(21) Appl. No.: 09/339,026

(22) Filed: Jun. 23, 1999

(30) Foreign Application Priority Data

Mar. 1, 1999 (CA) .................................................. 2263238

(51) Int. Cl.[7] .................................................. E02B 15/04
(52) U.S. Cl. .............................. 405/63; 405/60; 405/118; 210/242.4; 210/242.1; 210/922; 210/924
(58) Field of Search .................................. 405/114, 115, 405/15, 270, 37, 38, 60, 62, 63, 52, 53, 54, 80, 118; 210/922, 924, 242.1, 242.3, 242.4

(56) References Cited

U.S. PATENT DOCUMENTS

| | | | |
|---|---|---|---|
| 3,779,382 | * 12/1973 | Steltner | 210/242.3 |
| 3,984,987 | * 10/1976 | Light, Jr. | 405/63 |
| 4,070,864 | * 1/1978 | Jarvis | 405/115 |
| 4,111,813 | * 9/1978 | Preus | 210/924 |
| 4,136,995 | * 1/1979 | Fish | 405/115 |
| 4,190,381 | * 2/1980 | Knaus et al. | 405/63 |
| 4,279,535 | * 7/1981 | Gagliardi et al. | 405/15 |
| 4,497,712 | * 2/1985 | Cowling | 210/924 |
| 4,610,794 | * 9/1986 | Tsahalis | 210/242.3 |
| 4,759,847 | * 7/1988 | Medbury | 210/924 |
| 4,946,308 | * 8/1990 | Chevalier | 405/15 |
| 5,039,250 | * 8/1991 | Janz | 405/15 |
| 5,108,224 | * 4/1992 | Cabaniss et al. | 405/52 |
| 5,165,821 | * 11/1992 | Fischer et al. | 405/63 |
| 5,257,878 | * 11/1993 | Peterson | 405/15 |
| 5,580,190 | * 12/1996 | Hsu | 405/15 |
| 5,588,785 | * 12/1996 | Holland | 405/270 |
| 5,645,378 | * 7/1997 | Holland | 405/270 |
| 5,660,505 | * 8/1997 | Emory, III | 405/15 |
| 5,688,075 | * 11/1997 | Gradek | 405/63 |
| 5,730,558 | * 3/1998 | Holland | 405/270 |
| 5,885,451 | * 3/1999 | Porrovecchio, Sr. | 210/242.4 |
| 5,906,572 | * 5/1999 | Holland | 405/270 |
| 5,948,250 | * 9/1999 | Middleton | 210/924 |

\* cited by examiner

*Primary Examiner*—Thomas B. Will
*Assistant Examiner*—Alexandra K Pechhold
(74) *Attorney, Agent, or Firm*—Oyen Wiggs Green & Mutala

(57) ABSTRACT

A portable pollution control apparatus designed to span a creek or other small waterway. The apparatus includes an adjustable length boom which extends across the creek; an elongated, hydrocarbon-absorbent sock which is suspended from the boom and extends within the creek downstream from the boom; and a sheet of water-porous fabric connectable to the boom and extending upstream therefrom to function as a sediment trap. The fabric sheet in preferably deployed on the creekbed and banks to form a settling pond immediately upstream from said boom to permit settling of sediment.

12 Claims, 4 Drawing Sheets

WATERWAY POLLUTION CONTROL APPARATUS

TECHNICAL FIELD

This application relates to a portable pollution control apparatus designed for spanning creeks and other small size waterways. The apparatus traps sediments and absorbs water-borne hydrocarbons.

BACKGROUND

There is an increasing awareness that logging, road building and other similar operations in remote locations can cause significant environmental damage to fish habitat. Many species of fish spawn in small creeks which are particularly vulnerable to hydrocarbon spills or run-off containing sediment. Destruction of fish habitat can have a profound adverse affect on the whole forest ecosystem.

Some jurisdictions have recently imposed stringent regulations to limit the environmental impact of logging operations. The need has therefore arisen for improved pollution control devices which are particularly suited for temporary installation to protect creeks in remote locations.

One conventional approach for trapping sediment is to stack hay bales in a creek bed downstream from logging operations. The hay bales effectively function as an organic filter permitting the flow of water while acting as a barrier blocking the passage of sediment to downstream locations of the creek. A major shortcoming of this approach is that sediment which accumulates on the upstream side of the hay bales remains in the waterway and is often dispersed downstream when the hay bales are removed and the creek returns to its normal flow pattern.

"Silt fences", which consist of sheets of woven polypropylene installed to extend across small waterways, suffer from the same limitation. The sheets allow the flow of water therethrough but trap sediment fines. However, not all of the fines settle on the creekbed and they may be dispersed downstream when the sheets are removed from the creek after the upstream logging operations or the like have been completed.

Conventional hay bale and silt fence barriers are also not capable of effectively containing hydrocarbon spills. While a great many hydrocarbon containing devices and methods are known in the prior art, the applicant is not aware of any prior art structures which are particularly adapted for spanning small waterways in conjunction with a sediment trap.

SUMMARY OF INVENTION

In accordance with the invention, a waterway pollution control apparatus is disclosed. The apparatus includes an adjustable length boom extending across the waterway; an elongated, hydrocarbon absorbent sock suspended from the boom for extending in the waterway downstream from the boom; and a sheet of water-porous material connected to the boom and extending upstream therefrom to cover the bed of the waterway, the sheet having a pore size sufficient to substantially trap water-borne sediment. The sheet is deployed on the bed and banks of the waterway to form a settling pond immediately upstream from the boom to permit settling of the sediment. The sheet may consist of geotextile fabric.

The boom may include a plurality of releasably connectable telescopic elements and a pair of shoes anchored on opposite sides of the waterway. Each of the shoes is releasably connectable to an end portion of one of the elements.

In one embodiment, the telescopic elements comprise at least one first tube and a second tube slidable within the first tube; and each of said shoes comprises a pair of tubular sleeves, wherein each of the sleeves is sized to snugly receive an end portion of either the first tube or the second tube.

A portable waterway pollution control kit is also disclosed comprising an adjustable length boom extendable across the waterway; an elongated, hydrocarbon absorbent sock suspendable from the boom for extending in the waterway downstream from the boom; and a sheet of water-porous material connectable to the boom and extending upstream therefrom to cover the bed of the waterway, the sheet having a pore size sufficient to substantially trap water-borne sediment.

The application further relates to a method of controlling the dispersion of pollutants into a waterway in the vicinity of a work site comprising the steps of:

(a) extending a boom across the waterway at a location downstream from the work site;

b) removably anchoring end portions of the boom on opposite sides of the aterway;

(c) suspending an elongated hydrocarbon-absorbent sock from the boom such that the sock extends across the waterway at a location downstream from the boom;

(d) providing a sheet of water-porous material having a pore size sufficiently small to trap water-borne sediment;

(e) connecting an end portion of the sheet to the boom; and (f) removably anchoring the sheet on the bottom and banks of the waterway.

BRIEF DESCRIPTION OF DRAWINGS

In drawings which describe embodiments of the invention, but which should not be construed as restricting the spirit or scope thereof.

DESCRIPTION

Figure 1:
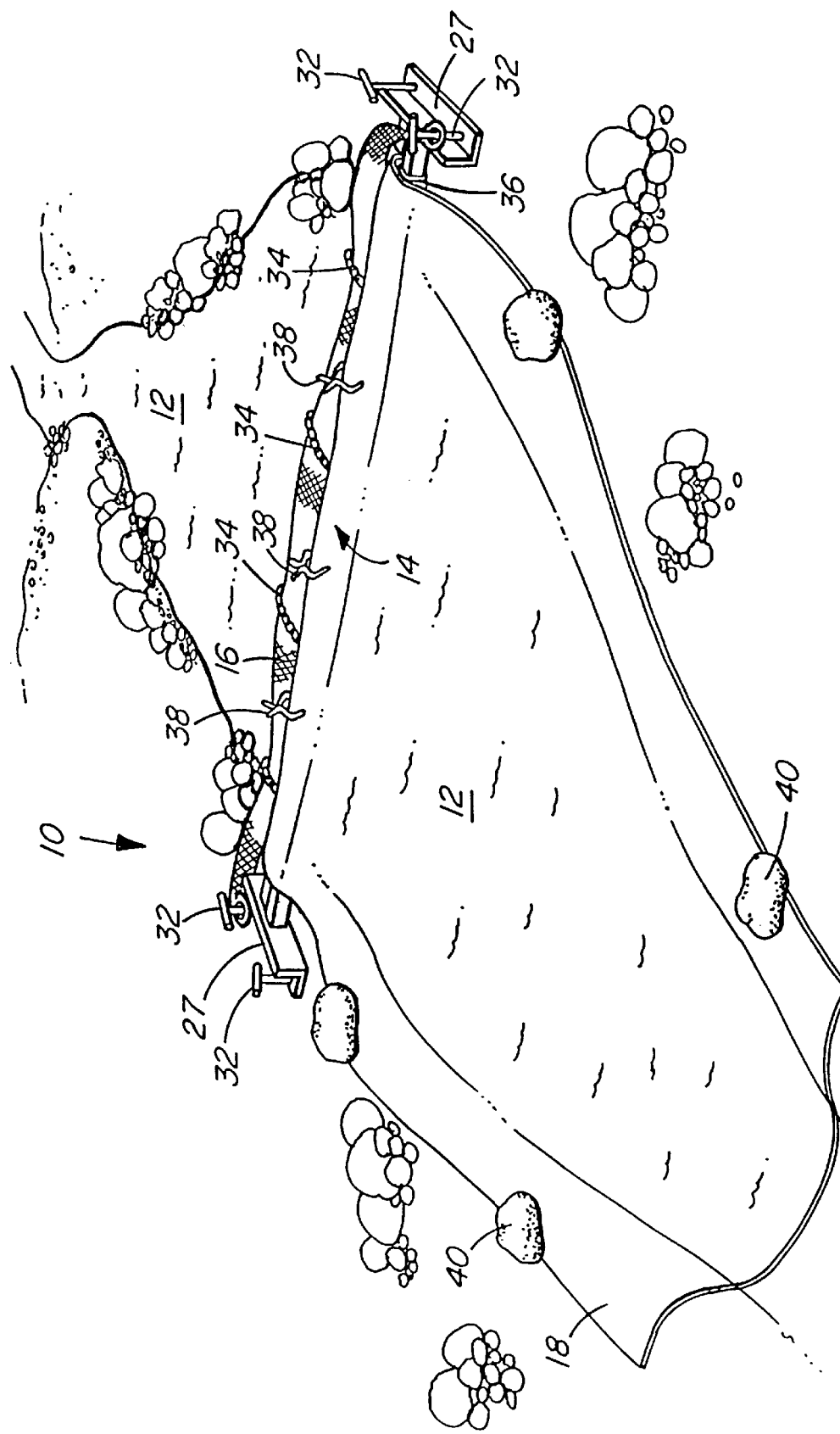
FIG. 1 is an isometric view of the applicant's portable pollution control apparatus installed to span a small creekbed.

The applicant's portable pollution control apparatus 10 is adapted to span a creek 12 or other small waterway. Apparatus 10 comprises an adjustable length boom 14 which extends above creek 12; an elongated, hydrocarbon absorbent sock 16 which is suspended from boom 14 and extends across creek 12 downstream from boom 14; and a sheet of water-porous fabric 18 having one end connected to boom 14 and which extends upstream from boom 14 to function as a sediment trap.

Figure 4:
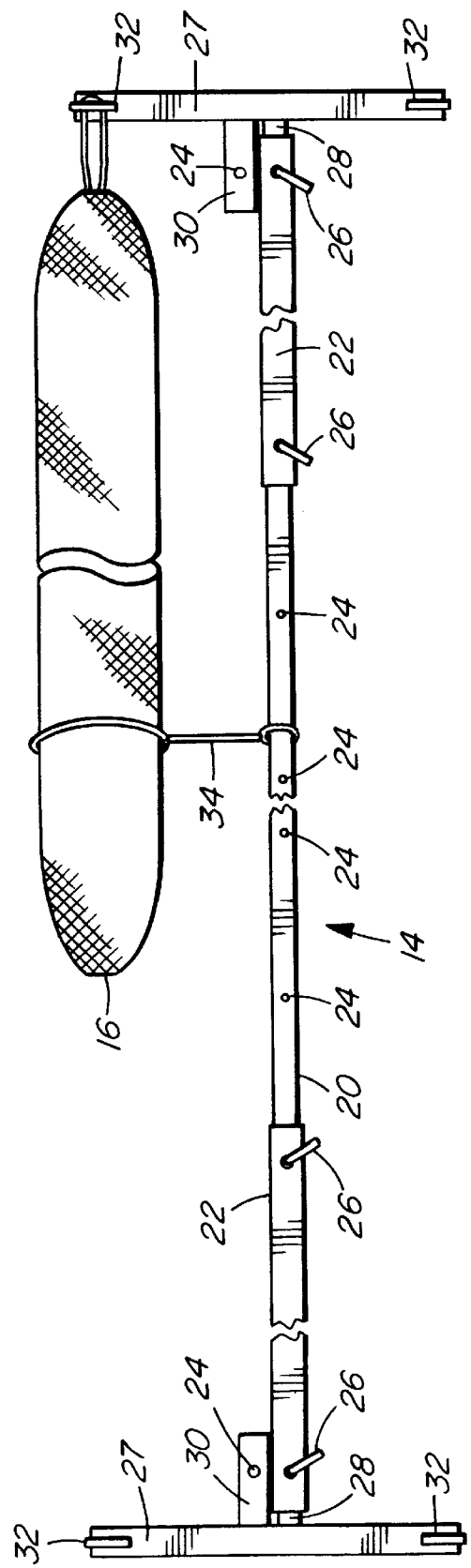
FIG. 4 is an enlarged plan view of the apparatus of FIG. 1.

As shown best in FIG. 4, boom 14 comprises a plurality of telescopic tubes which are slidable relative to one another. In the illustrated embodiment, a middle tube extension 20 is slidable within respective outer tube extensions 22. Tube extensions 20, 22 have apertures 24 drilled therein at spaced intervals. Boom 14 may be fixed at the desired length by aligning apertures 24 of overlapping tube extensions 20, 22 and inserting a locking pin 26 in each of the aligned apertures 24.

Each end of boom 14 is coupled to an anchor shoe 27. Each shoe 27 includes a first sleeve 28 and a second sleeve 30 which project inwardly side by side. Both sleeves 28 and 30 are tubular and include an coupling aperture 24. Second sleeve 30 has a smaller diameter than first sleeve 28. As shown in FIG. 4, sleeves 28 are sized to fit within end portions of respective outer tube extensions 22. Depending upon the width of creek 12, it may be necessary to use only two telescopic tubes, namely tube extension 20 and one outer tube extension 22. In this case, an end portion of extension 20, which has a smaller diameter than extension 22 as discussed above, is fitted into second sleeve 30. Each tube extensions 20, 22 is releasably coupled to a corresponding sleeve 28, 30 with a locking pin 26 as shown in FIG. 4.

Figure 3:
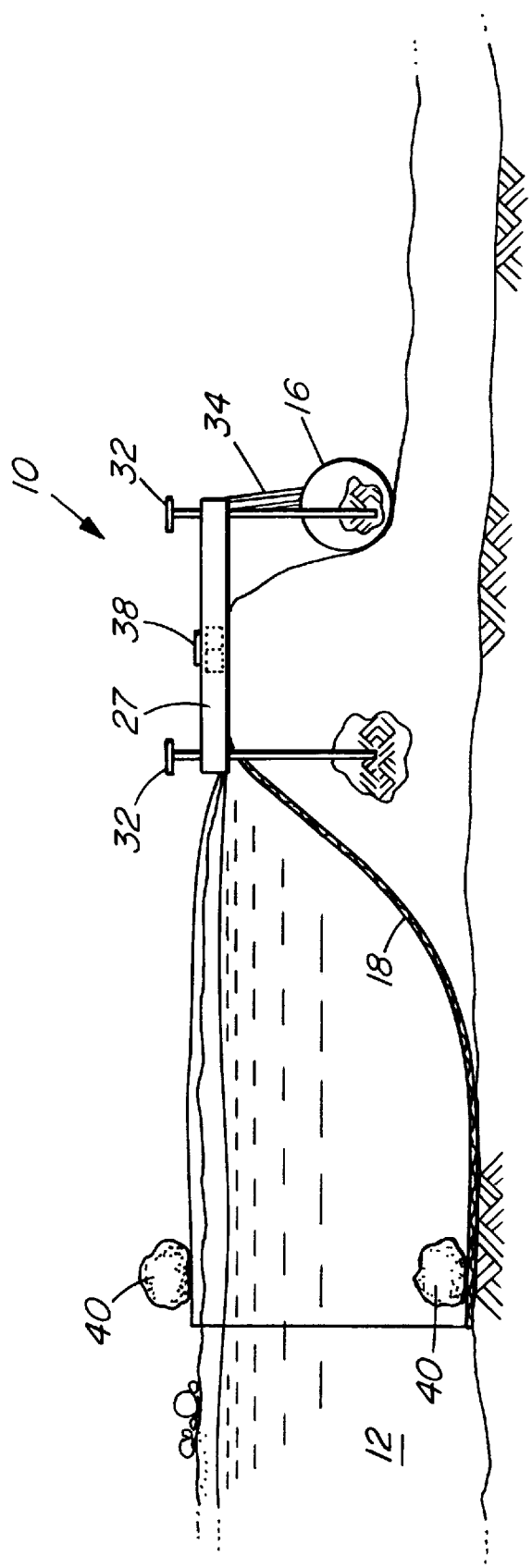
FIG. 3 is a side view of the apparatus of FIG. 1.

Anchor shoes 27 are preferably T-shaped in plan view and are staked on opposite sides of creek 12 with anchor pins 32, best shown in FIG. 3. Each anchor shoe 27 includes apertures at either end for receiving pins 32.

Figure 2:
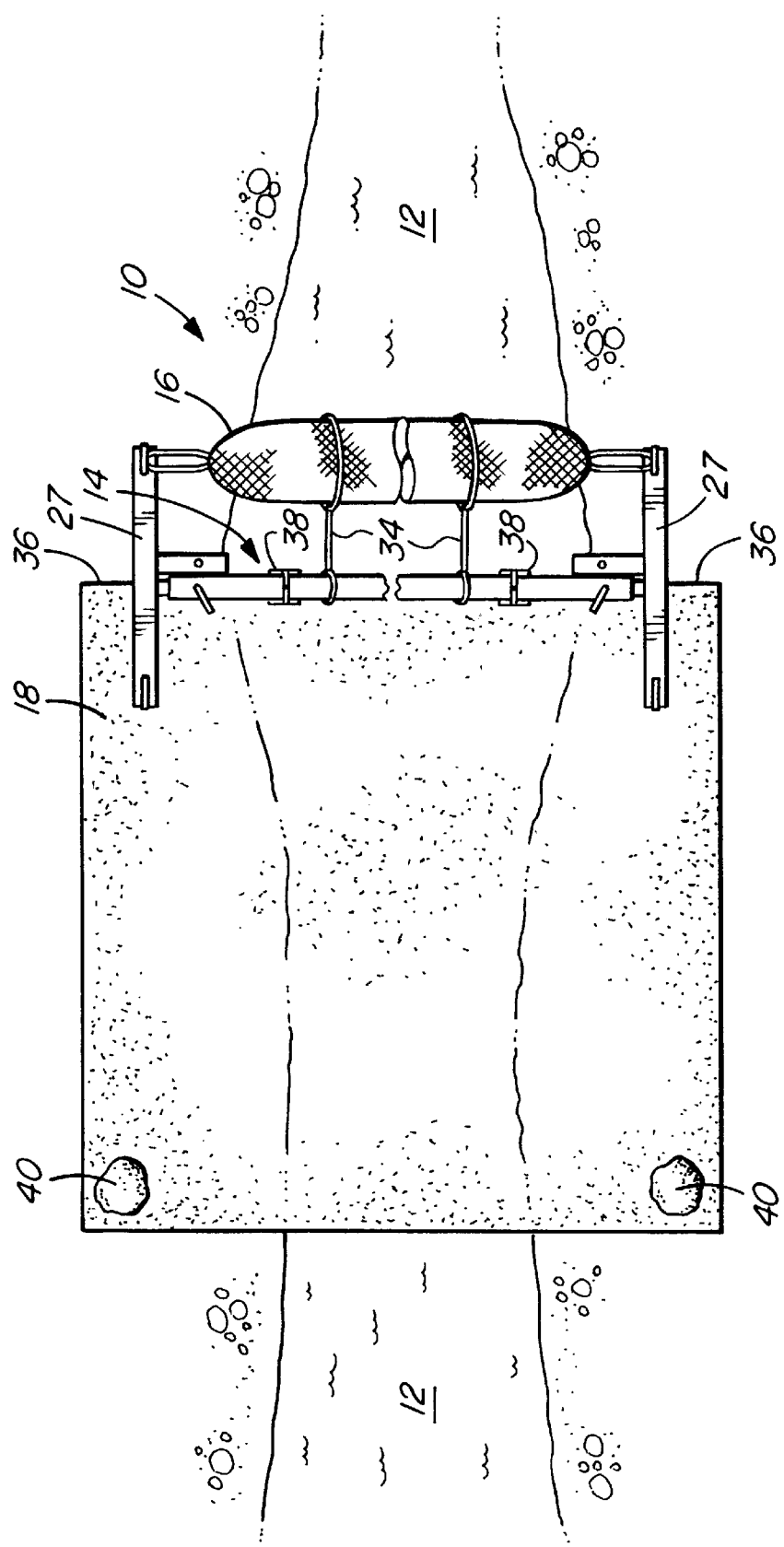
FIG. 2 is a diagrammatic plan view of the apparatus of FIG. 1.

After extensible boom 14 has been fixed at the desired length and anchored on either side of creek 12 as described above, elongated sock 16 is suspended from boom 14 on the downstream side thereof. Sock 16 preferably consists of a length of hydrophobic polypropylene which selectively absorbs any water-borne hydrocarbons. End portions of sock 16 may be fastened to opposed anchor pins 32 at the downstream ends of anchor shoes 27 (FIGS. 2 and 4). Midportions of sock 16 are releasably coupled to boom 14 at spaced intervals with a plurality of nylon ropes or chains 34. Preferably each rope 34 has a plastic clip at either end. This enables an end portion of rope 34 to be wrapped around sock 16 and clipped in place to function as a choker cinch. Sock 16 is preferably connected to boom 14 with sufficient slack so that approximately one-third of sock 16 extends below the surface of creek 12.

As shown best in FIGS. 1–3, the applicant's portable pollution control apparatus 10 further includes a sheet 18 of water-porous fabric. Sheet 18 has an end 36 which is wrapped around boom 14 and is releasably clamped thereto with a plurality of spaced-apart hand clamps 38. Sheet 18 is deployed upstream from boom 14 and is anchored on the creekbed and creek banks with rocks 40 or any other suitable anchors. Sheet 40 is preferably constructed from a water-porous geotextile material formed from polypropylene or polyester fibres. Suitable geotextile sheets 18 are available from Layfield Plastics of Edmonton, Alberta. While sheets 18 allow water to flow relatively freely therethrough, their pore size is sufficiently small to trap water-born sediment.

In use, apparatus 10 is installed as described above to span a small creek 12 a short distance downstream from logging operations or the like which could potentially damage fish habitat. Initially, water can flow relatively freely through fabric sheet 18 and past boom 14 and sock 16. Gasoline or other hydrocarbons which spill or seep into creek 12 will be substantially absorbed by sock 16.

If sediment or other granular pollutants are introduced into creek 12 upstream from boom 14, they will be trapped by sheet 18. In some circumstance the amount of sediment present in creek 12 may gradually clog the pores of sheet 18 reducing the rate of water throughput. This will result in the formation of a settling pond immediately upstream from boom 14 as the water level gradually rises. Eventually water will begin to spill over the top of boom 14 and past sock 16. However, the water flow rate is reduced to such an extent in the settling pond upstream of boom 14 that most of water-borne sediment will fall out of suspension and onto sheet 18 prior to the water passing over boom 14. Any water-borne hydrocarbons will continue to be absorbed by sorbent sock 16.

Once the logging operations or other potentially hazardous work upstream from apparatus 10 has been completed, sheet 18 is disconnected from boom 14 and side portions thereof are carefully folded over any sediment which has been deposited. The entire sheet 18 is then pulled from the creek onto the shoreline where the sheet 18 is allowed to dry and the sediment is removed. Thus the applicant's pollution control system enables deposited sediment to be effectively removed from creek 12 to eliminate any hazard to downstream fish habitat.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A portable waterway pollution control apparatus deployable in a waterway having a bottom surface comprising:
   (a) an adjustable length boom extending across said waterway;
   (b) an elongated, hydrocarbon absorbent sock suspended from said boom for extending in said waterway downstream from said boom; and
   (c) a sheet of water-porous material connected to said boom, said sheet having a pore size sufficient to substantially trap water-borne sediment,
      wherein said sheet has a length substantially greater than the depth of said waterway at the location of said boom, whereby said sheet covers a substantial portion of said bottom surface of said waterway upstream from said boom to permit said sediment to settle thereon.

2. The apparatus of claim 1, wherein said boom comprises a plurality of releasably connectable telescopic elements.

3. The apparatus of claim 2, wherein said boom further comprises a pair of anchor shoes removably positionable on opposite sides of said waterway, wherein each of said shoes is releasably connectable to an end portion of one of said elements.

4. The apparatus of claim 3, wherein said telescopic elements comprise at least one first tube and a second tube slidable within said first tube, and wherein each of said shoes comprises a pair of tubular sleeves, wherein each of said sleeves is sized to snugly receive an end portion of either said first tube or said second tube.

5. The apparatus of claim 1, wherein said sheet impedes the flow of water in said waterway upstream from said boom to form a settling pond immediately upstream from said boom to permit settling of said sediment.

6. The apparatus of claim 1, wherein said sheet comprises geotextile fabric.

7. The apparatus of claim 1, wherein said sheet has a width exceeding the width of said waterway in the vicinity of said boom, said sheet comprising opposed side portions positioned on opposed side portions of said waterway upstream from said boom.

8. A portable waterway pollution control kit deployable in a waterway having a bottom surface comprising:
   (a) an adjustable length boom extendable across said waterway at a deployed location;
   (b) an elongated, hydrocarbon absorbent sock suspendable from said boom for extending in said waterway downstream from said boom; and
   (c) a sheet of water-porous material connectable to said boom and having a pore size sufficient to substantially trap water-borne sediment, wherein said sheet has a length substantially greater than the depth of said waterway at said deployed location whereby said sheet is extendable upstream from said boom to cover a substantial portion of said bottom surface of said waterway to permit said sediment to settle thereon.

9. The apparatus of claim 8, further comprising anchors connectable to end portions of said boom for removably anchoring said boom to opposed side portions of said waterway at said deployed location.

10. The apparatus of claim 8, wherein said kit is sufficiently small in size such that it is portable by users in remote locations having no vehicle access.

11. The apparatus of claim 8, wherein said sheet has a width exceeding the width of said waterway at said deployed location, said sheet comprising opposed side portions positionable on opposed side portions of said waterway upstream from said boom.

12. A method of controlling the dispersion of pollutants into a waterway in the vicinity of a work site comprising the steps of:

(a) extending a boom across said waterway at a location downstream from said work site;
(b) removably anchoring end portions of said boom on opposite sides of said waterway;
(c) suspending an elongated hydrocarbon-absorbent sock from said boom such that said sock extends across said waterway at a location downstream from said boom;
(d) providing a sheet of water-porous material having a pore size sufficiently small to trap water-borne sediment;
(e) connecting an end portion of said sheet to said boom;
(f) removably anchoring said sheet on the bottom and banks of said waterway such that said sheet extends upstream from said boom covering the bed of said waterway;
(g) allowing said water-borne sediment to settle on an upper surface of said sheet; and
(h) removing said sheet from said waterway together with any of said sediment which has settled on said sheet.

\* \* \* \* \*